United States Patent [19]

Saint-Michel et al.

[11] Patent Number: 4,521,709

[45] Date of Patent: Jun. 4, 1985

[54] DIRECT CURRENT DYNAMOELECTRIC MACHINES WITH AUXILIARY EQUALIZER POLES

[75] Inventors: Jacques A. Saint-Michel, Maubeuge; Jean-Pierre Chabrerie, Gif; Alain Mailfert, Bouxieres Aux Dames, all of France

[73] Assignee: Etat Francais, Paris Armees, France

[21] Appl. No.: 415,994

[22] Filed: Sep. 8, 1982

[30] Foreign Application Priority Data

Sep. 10, 1981 [FR] France ............... 81 17129

[51] Int. Cl.³ .......................................... H02K 23/22
[52] U.S. Cl. .................................. 310/186; 310/178; 310/229; 310/237
[58] Field of Search ............... 310/178, 185, 186, 204, 310/211, 224, 225, 226, 229, 237, 256, 269

[56] References Cited

U.S. PATENT DOCUMENTS

| 1,416,256 | 5/1922 | Borger | 310/237 |
| 2,919,360 | 12/1959 | Mishima | 310/238 |
| 3,060,336 | 10/1962 | Liimatainen et al. | 310/211 |
| 4,031,419 | 6/1977 | Spiesberger et al. | 310/186 |
| 4,064,410 | 12/1977 | Roach | 310/211 |
| 4,308,480 | 12/1981 | Moody | 310/229 |
| 4,451,752 | 5/1984 | Tahara et al. | 310/186 |

Primary Examiner—Peter S. Wong
Assistant Examiner—Anita M. Ault
Attorney, Agent, or Firm—Parkhurst & Oliff

[57] ABSTRACT

In a rotating machine, for example heteropolar, auxiliary poles (14) are placed in practically the field poles (4) and close to the peripheral of a salient section (δ) of rotor (2), the same azimuth symmetry plane as the poles are supplied by a current (i) regulated by a power supply and auxiliary regulation device (16), the armature current (I) and rotation speed (N) of the rotor expose armature conductors (8) in commutation to an equalizing flux providing for arc-free commutation. Auxiliary poles can be supplied with a current regulated by the field current to cancel the currents flowing in the armature conductors on the field poles. These machines, for example also acyclic with voltage step-up, have high specific power and efficiency, and can be employed for example, in electric traction or propulsion.

11 Claims, 8 Drawing Figures

DIRECT CURRENT DYNAMOELECTRIC MACHINES WITH AUXILIARY EQUALIZER POLES

This invention is directed to improvements to direct current dynamoelectric machines, and more particularly, to devices aiding in the commutation with homopolar and heteropolar machines.

When in operation, direct current dynamoelectric machines involve a certain number of problems due to the commutation phenomena which occur on the interface between the sliding contacts and the armature conductors. Very considerable progress has been made in the production of the actual sliding contacts, resulting notably in the development of multi-filament sliding contacts which for example have been the subject of French Pat. No. 2404936, whose content is assumed to be integrated herein for reference. Notwithstanding this, the commutation phenomena develops whenever a field conductor is inserted under the sliding contacts or lead contacts. For example, this type of phenomenon occurs on the armature conductors in voltge step-up type homopolar machines. Moreover, although the magnetic armature reaction can be equalized conventionally by the return of the armature current to the surface of the field poles, it is also necessary to beware of stray currents which may be generated in the armature conductors from a lack of homogeneity of the magnetic fields in the active sections of the machine. In this respect, the operating of a heteropolar machine under each field pole is similar to that of a conventional homopolar machine.

The stray currents can thus flow between the different conductors adjacent to the armature which are temporarily in parallel through the sliding contacts.

Insofar as concerns the commutation problems occurring on the interface between the sliding contacts and the armature conductors, a proposal has been made to add to the main conventional contacts or brushes responsible for conveying the armature current outside the commutation phases, auxiliary brushes or contacts. These brushes or contacts are relatively complex in structure, consisting of a succession of elementary sliding contacts added to the positive area of a main sliding contact. These different elementary auxiliary contacts each being linked to the conductor of the main sliding contact by resistors. These resistors are in series with the different elementary contacts and increase in magnitude in the direction away from the main contact. The purpose of these resistors is to increase the decay rate of the current in the armature conductors linked to the different sliding contacts. Apart from its complexity and bulk, this technique offers the drawback of being dissipative and not appearing to be genuinely effective as to the non-development of commutation arcs in all conditions of operating according to the armature current and speed of rotation. Furthermore, it inhibits reversals of the direction of rotation. Moreover, this system offers no solution to the problem of stray currents flowing between the different conductors of the armature.

The precise provide of this invention is to propose improvements to direct current dynamoelectric machines in view of largely solving the fundamental problems involved with the commutation phenomena referred to above and which, at the present time, restrict the development of this type of machine, proposing simple and effective means adaptable to all machine geometries and producing arc-free commutation and a substantial cancellation of the flow currents.

Another provide of this invention is to propose improved dynamoelectric machines offering a higher specific power and efficiency or, with the same specific power, an induced voltage higher than could be obtained with a conventional homopolar machine. It can also be employed, as required, in conventional direct current dynamoelectric machines.

For this purpose, according to a characteristic of this invention, the direct current dynamoelectric machine comprises a stator containing a ferromagnetic frame, at least one field winding or permanent magnet, at least one field pole with an azimuth symmetry plane, and a cylindrical internal housing for a rotor. The rotor comprises armature conductors linked at one end of the rotor to a commutator ring device which co-operates with sliding contacts installed on the stator. associated with the field pole, at at least one end of the field pole is an auxiliary pole which is more or less in the same symmetry plane or having a symmetry plane passing through the interpolar axis as the field pole. The auxiliary pole is supplied by a current regulated by at least one of the machine's operating currents.

According to another characteristic of this invention, the current supplying the auxiliary poles is regulated by the armature current and by the rotation speed of the rotor and/or the field current.

With the organization of auxiliary poles associated to the field poles, and according to the regulation of the current supplying these auxiliary poles, some of these auxiliary poles can be designed in heteropolar machines to assist commutation. The other auxiliary poles can be designed to cancel flow currents. Rather than all the auxiliary poles being used as an aid to commutation in acyclic voltage step-up type machines. It will be observed that both the organization, the supply the layout of these auxiliary poles distinguishes them from the auxiliary poles sometimes proposed in conventional direct current electric machines.

Other characteristics and advantages of this invention will appear as the following description of the methods of production proceeds, when taken in connection with the accompanying drawings, in which:

FIGS. 1 and 2 provide a schematic view of a stator and a rotor, respectively, of a two-pole machine adapted to this invention (the auxiliary poles being omitted);

FIG. 3 displays schematically on a larger scale, the organization of an auxiliary commutating pole according to the invention;

FIG. 3A displays schematically the organization of an auxiliary commutating pole, according to the invention, around the interpolar axis of the machine in FIG. 1;

As previously mentioned, in an electric induction machine, when an armature conductor, located under one of the field poles, and hence subject to the nominal electromotive or counter-electromotive force, commences to leave the brushes or sliding contacts, the current I that it conveys has a natural tendency to die away owing to the gradual increase in the contact resistance. Nevertheless, when the speed of motion is high so that therefore the commutation time is short on each armature conductor, the current decay is nevertheless shown to be insufficiently rapid owing to the inductance of the armature circuit. Thus, the density of the current in the brushes or sliding contacts during commutation increases considerably and much feared electric arcs develop systematically. This phenomenon is all the more marked when the contact resistance of the brushes is low, which is nevertheless highly desirable from the point of view of the efficiency of the electric machine. To take an example, in the specific case of a generating machine, if the electromotive force induced in the conductor which leaves the brushes or sliding contacts is lower then that on the terminals of the other adjacent conductors (which are momentarily all linked in parallel via the brushes or sliding contacts), the decay of the current will be facilitated. Conversely, it is desirable to make every effort to facilitate the build-up of the current in the armature conductor which is inserted under the sliding contacts, by increasing its electromotive force. The inventors have made extremely detailed studies on the growth and decay of these currents in the armature conductors through digital methods, and have developed a technique, subject of this invention, making it possible to produce a practically perfect commutation (growth and decay of the current being linear, together with infinitely slow speed of motion), whatever the rated current of the machine and its speed of motions. This is accomplished by correctly regulating the additive or subtractive electromotive forces in the armature conductors which commutate in line with the sliding contacts through additional auxiliary poles. It must be observed that the order or magnitude of the auxiliary electromotive forces is low (typically, of the same order as the voltage drops on the brushes or sliding contacts) and that it is thus a simple matter to generate these electromotive equalizer forces through low-size auxiliary poles, the which can therefore be organized quite easily, whatever the number of poles on multi-polar machines.

Figure 1:
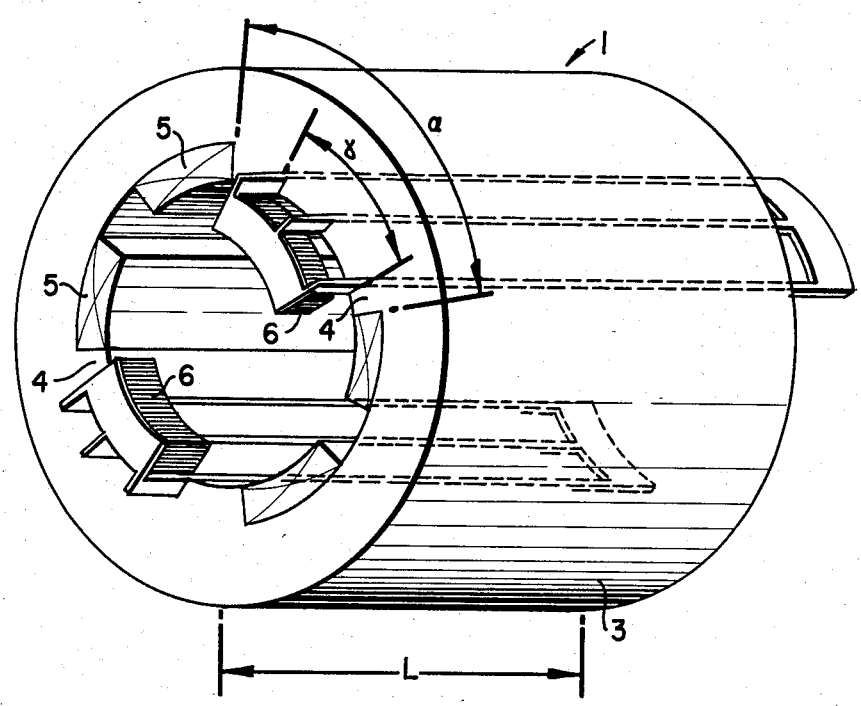
Figure 2:
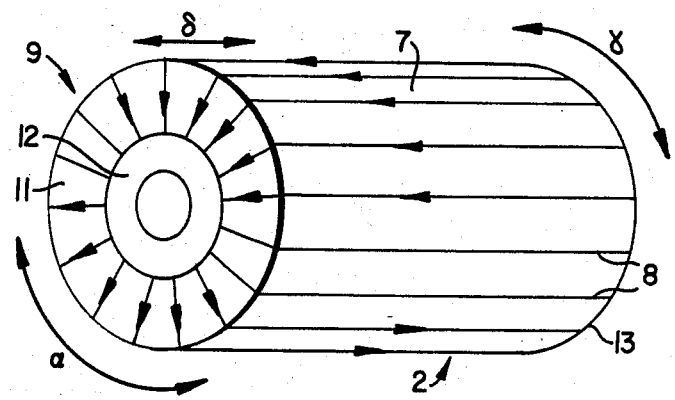
Figure 3:
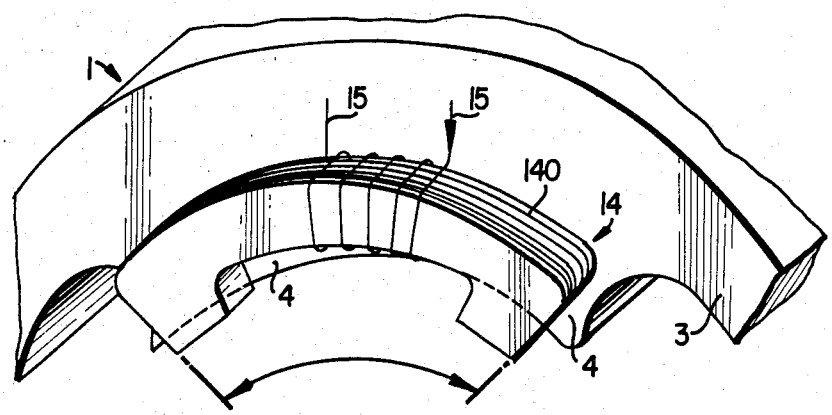
Figure 4:
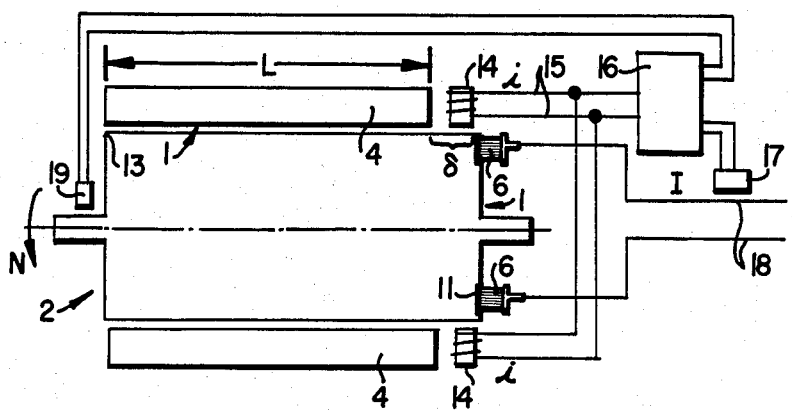
FIG. 4 is a diagram showing a machine according to this invention, and illustrating the organization of the auxiliary commutating poles and their means of electric current supply.
Figure 5:
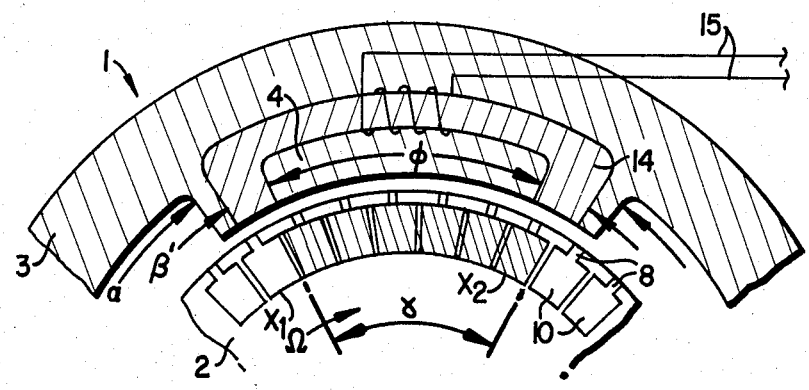
FIG. 5 is a schematic end view of this type of machine, in line with a field pole, showing the respective organization of the poles and sliding contacts.

FIGS. 1 to 5 show a direct current dynamoelectric machine, according to the invention (in this case two-pole, for example), which contains a stator 1 and a rotor 2. The structure of stator 1 (FIG. 1) comprises a frame 3 in magnetic material, typically ferromagnetic, generally of cylindrical shape, forming, diametrically opposite, field poles 4, each with a corner angle $\alpha$, to which are associated field windings 5. On one of the sides frame 3 are inserted, axially offset from this side, sliding contacts 6, in this case multi-filament contacts, covering an angle $\gamma$ less than the corner angle $\gamma$ of the adjacent field pole and in the same radial symmetry axis as the field pole. The structure of rotor 2 comprises a cylindrical rotor body 7 containing, on its circumference, a number of longitudinal slots distributed along a regular angularity, each slot containing one single armature conductor 8, insulated from the magnetic frame composing the rotor. The slots containing the conductors are correctly inclined in relation to the longitudinal axis to eliminate the reluctance effects. These conductors can be solid with low power machines, or the so-called Roebel type for high power machines. Each conductor 8 is secured, at one first end 9 of rotor 2, to a flat collector strip inserted on the front side 11 of the first end 9 of rotor 2. These strips being V-shaped and being fitted one alongside the other, according to the pattern of the armature conductors 8, to form a collector ring 12 opposite the internal bearing faces of the sliding contacts 6. It is quite clear that the collector, instead of being frontal type, can be of any other suitable type, for example cylindrical or conical. In FIG. 5, the hachured collector strips are those in contact with the sliding contacts associated to field pole 4. With the direction of rotation $\Omega$ indicated, strip $X_1$ with its associated armature conductor commences to insert under the contacts, whereas strip $X_2$ with its associated conductor commences to leave the contacts. At the second end of rotor 2, the different longitudinal armature conductors 8 are mutually combined in parallel by a short-circuit ring 13 (FIG. 2), given that the machine described is two-poled. In the case of a multi-polar machines, the short-circuit ring would be replaced by a second collector. In accordance with one aspect of the invention, the rotor body 7 has a slight extra axial length $\delta$ as compared to the length L of frame 3 of stator 1, so as to be slightly salient from at least one of the front sides of frame 3 to place the auxiliary poles which should concern the end areas of armature conductors 8 in this salient portion of the rotor body, as will be seen below.

Figure 3A:
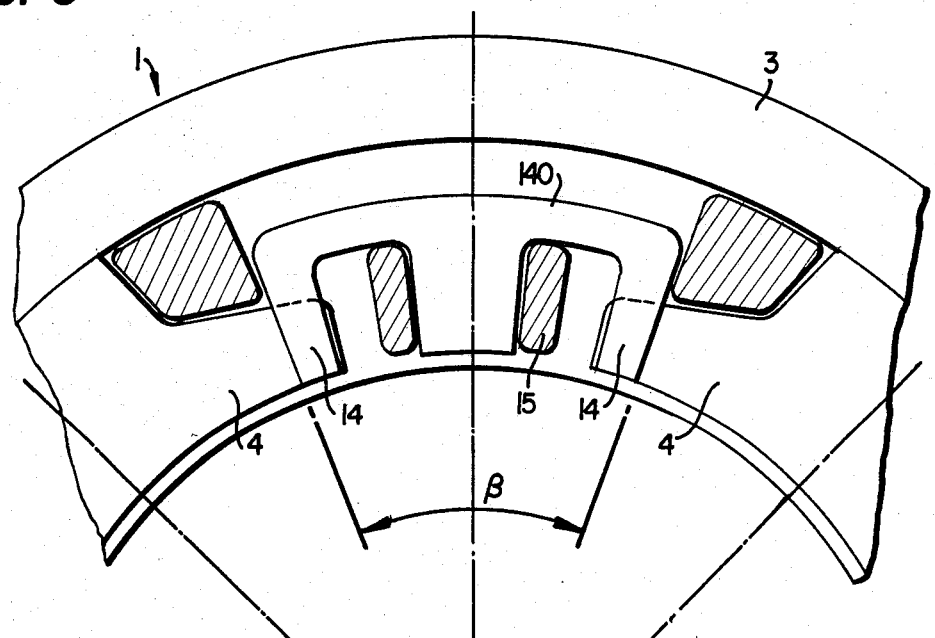

As shown in FIGS. 3 to 5, on the end face of the frame 3, small size auxiliary poles 14 are installed, in the axial extension of each field pole 4 or in the interpolar axis. The auxiliary poles consisting of a magnetic circuit 140, in low hysteresis lamellar ferromagnetic material. This is in the form of a rounded U-link (FIG. 3), or in the form of a rounded E (FIG. 3A). The North and South poles of these magnetic circuits having an internal profile matching that of field poles 4. In the first case, the corner angle $\beta$ of the auxiliary magnetic circuit is slightly less than the corner angle of the field pole. The axial azimuth symmetry plane of contact 140 can form with that of the field pole, a dihedral angle between 0 and $\pm(\alpha-\beta)$, notably to take into account the inclination of the ends of the brush filaments. In the second case, the corner angle is greater than the interpolar corner angle. A power conductor 15 is wound on the central portion of the magnetic circuit of auxiliary poles 14, through which a current of amperage i flows. The current is regulated by an operating current of the machine. The organization of the auxiliary poles 14 on the circumference of the extra-long portion of rotor 2 thus allows armature to be in commutation. The magnetic flux of the auxiliary poles induces in the armature conductors, now in commutation, the electromotive or counterelectromotive equalizing force.

As referred to above, in the case of heteropolar machines, at least some of the auxiliary poles are preferentially assigned to assist commutation. In this case, as shown in FIG. 4, the conductors supplying auxiliary poles 15 are linked to a supply and regulation device 16 which receive signals firstly from a detector 17 which indicates the armature current I flowing in lines 18 connected to sliding contacts 6 and, secondly, a detector 19 which indicates the speed of rotation N of rotor 2. These conductors supply the auxiliary poles 14 with an equalizing current i, regulated by device 16, by the armature current I and by the speed of rotation N. This will result in a perfect balance between the additive and subtractive electromotive forces in the commuting conductors. The technology of the supply and regulation device 16, of which can be either analog or digital type, is within reach of all average well-informed technicians, so that the detils will not be given here.

To take an example, with a generator, whose load resistance R (purely resistive) is equal to the internal resistance Ro (corresponding to the electrical resistance on the contacts, the resistance r of the windings being assumed to be negligible, also the mutual inductance between two adjacent armature conductors), $\Delta t$ being the commutation time (i.e. the time required, depending on the speed of rotation, by a collector strip 10 under a brush, E being the difference in potential on the terminals of the sliding contacts and $\tau$ a time constant of the machine ($\tau = L/Ro$, in which L is the natural inductance of the machine), the following relation is obtaied, which determines the electromotive equalizing force e (and hence the equalizing current i):

$$e/E = 0.5 \times \tau/\Delta t.$$

As also referred to above, the auxiliary poles can also be used, in heteropolar machines, for any other task than assistance in commutation, and as this case, in the cancelling of the currents flowing in the armature conductors. In an electric machine of the type considered, it is practically inevitable that the induction under the field poles 4 be slightly non-homogeneous when an azimuth movement takes place under these poles. This non-homogeneity may reach a few percent if the manufacturing and assembly precisions of the machine are not of excellent quality, or if the ferromagnetic material of the stator is highly saturated. In these conditions, it is possible that considerable if not highly intense flow currents may be involved in the armature conductors 8 under the field poles, thus establishing prohibitive dissipations. As described previously, by placing in the axial extension of certain field poles 4 of the machine, auxiliary poles 14 with the same general composition as described in relation with FIGS. 3 to 5, by experimenting it is also possible to correctly homogenize the electromotive or counter-electromotive forces on the terminals of each armature conductor under the poles. In this case, however, the auxiliary poles are supplied with a current i' this time regulated by the field current, through a supply and regulation device (not shown) similar to the device 16 in FIG. 4, associated to a current detector of the same type as detector 17 and also a magnetic induction detector for machines with separate excitation. In practice, notably for large and high-power machines, an auxiliary pole assisting commutation and at least one pole cancelling the currents flowing, installed in the gap $\phi$ between the North and South poles of pole 14 assisting commutation, will be associated to each field pole.

It will be observed that the additional electromagnetic circuits assisting commutation or cancelling the flow currents are completely independent of the field magnetic circuit of the machine, and are thus in no way affected by the saturation of the latter.

Figure 6:
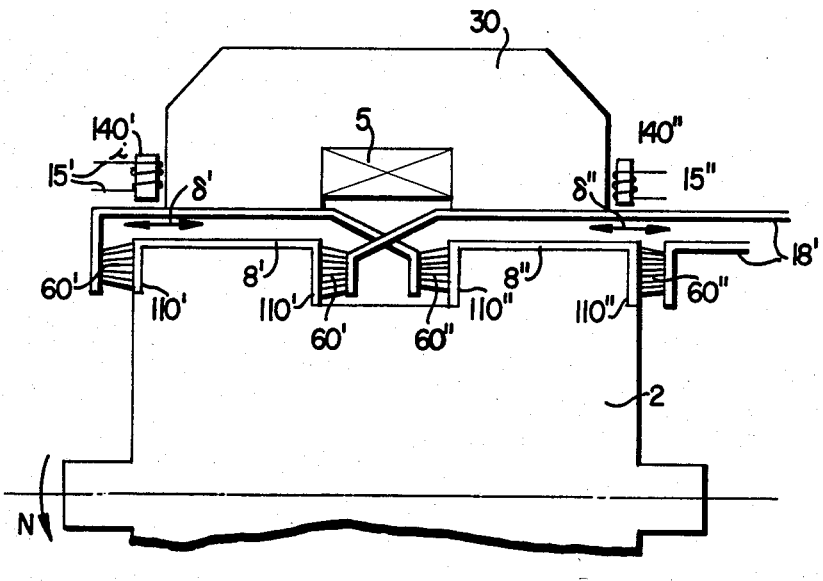
FIG. 6 is a schematic side view of a homopolar voltage step-up type machine equipped with auxiliary poles in accordance with the invention.
Figure 7:
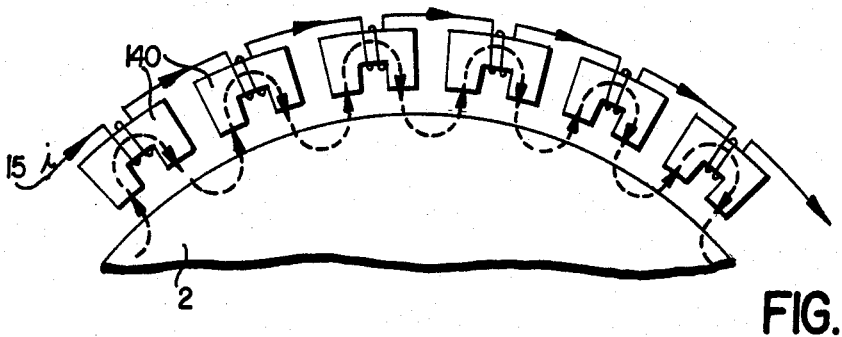
FIG. 7 is a schematic end view of a preferential procedure for organizing the auxiliary poles in the machine in FIG. 6.

A procedure for producing a homopolar, voltage step-up type machine in accordance with this invention is shown in FIGS. 6 and 7. In this type of homopolar machine, the armature conductors are linked, at their longitudinal ends, to collector rings cooperating with sliding contacts linked electrically $2 \times 2$ and crossed, so that the conductors located in the two active half-sections cooperate serially. In fact, the implementation procedure shown in FIG. 6, rotor 2 is broken down into two longitudinal half-sections whose parallel armature conductors 8' and 8'' are each linked to pairs of frontal collector rings 110' and 110' cooperating with crossed pairs of multi-filament sliding contacts 60' and 60'' . In this type of machine, rotor 8 is installed in a main magnetic circuit, forming polar section 30 which is equipped with a field winding 5. As in the previous implementation procedure, the rotor body 2 is salient auxiliary, but in this type on either side of the magnetic circuit 30 by a distance $\delta'$ and $\delta''$ respectively. Also, as in the previous implementation procedure, auxiliary poles reference 140 (140' for the left-hand section of the machine, 140'' for the right-hand section) are supplied by conductors 15' and 15'' with current i regulated by armature current I and the speed of rotation N of the rotor, which are installed on the circumference of these salient sections $\delta''$ and $\delta''$ of the rotor. Here, a series of auxiliary poles 140 distributed angularly and supplied serially by conductors 15, as can be seen on FIG. 7, is associated to each front face of the main magnetic circuit 30. The purpose of the fixed conductors, located on the internal circumference of the annular field pole and notably used to equalize the armature reaction, is also to serialize the armature conductors of each active half-section.

Although this invention has been described in relation with specific implementation procedures, it is not restricted to these but rather is capable of modifications and alternative versions. This is true for both multi-polar machines and acyclic voltage step-up machines, where the auxiliary equalizing flux can circulate in different ways according to the morphology of the machines, and to the technologicl requirements. It will be observed that with certain machines with specific applications, the auxiliary poles can be replaced by permanent magnets or these the magnets combined with simplified auxiliary pole elements. According to the invention, the machines can be used, owing to their high specific power and efficiency, in very varied fields such as traction, propulsion or electromagnetic variators, pulsing machines or electromagnetic starters.

We claim:

1. A direct current electrodynamic machine comprising a stator and a rotor, said stator containing a ferromagnetic frame defining an internal cylindrical housing for said rotor, at least one field winding, at least one field pole with a radially symmetric axis, said rotor containing a plurality of armature conductors linked at one end of said rotor to a collector ring device, said ring device cooperating with at least one sliding contact arranged on said stator near said field pole, said field pole having at one axial end at least one auxiliary pole arranged in the same radially symmetric plane and at substantially the same radius as said field pole, said auxiliary pole being supplied a current regulated by at least one operating current of said machine.

2. The machine according to claim 1, wherein said rotor is longitudinally longer than at least one end of said stator, said auxiliary pole arranged axially at one end of said field pole so as to be in the circumference of said longer end of said rotor.

3. The machine according to claim 2, wherein said collector ring is arranged on the front face of one end of said rotor.

4. The machine according to claim 3, wherein said sliding contacts are multi-filament type and arranged to extend along an arc of the circle defining one end of said stator and in the same radially symmetric plane as said field pole.

5. The machine according to claim 4, wherein said rotor additionally comprises angularly distributed slots an armature conductor arranged in each of said slots, and a short-circuit ring for said armature conductors arranged at an end opposite said collector ring of said rotor.

6. The machine according to claim 1, wherein said machine additionally comprises a device for regulating the supply current of said auxiliary pole as a function of the armature current.

7. The machine according to claim 6, wherein said device regulates the supply current of said auxiliary pole as a function of the speed of rotation of said rotor.

8. The machine according to claim 7, wherein said device regulates the current of said auxiliary pole as a function of the field current.

9. The machine according to claim 8, wherein said machine is a heteropolar machine.

10. The machine according to claim 8, wherein said machine is a homopolar voltage step-up type machine.

11. The machine according to claim 1, wherein said rotor is longitudinally longer than at least one end of said stator, an auxiliary magnetic circuit is arranged in the interpolar axis at the end of said field pole, and said auxiliary pole is arranged in the circumference of said longer end of said rotor.

* * * * *